(12) United States Patent
Eluwah et al.

(10) Patent No.: US 12,173,896 B2
(45) Date of Patent: Dec. 24, 2024

(54) INTEGRATED FLARE SYSTEM FOR GAS PLANT

(71) Applicant: SAUDI ARABIAN OIL COMPANY, Dhahran (SA)

(72) Inventors: Chidozie Eluwah, Dhahran (SA); Nasser Humaid, Dhahran (SA); Waleed Alhazmi, Olaya (SA); Ibrahim Al-Hamdan, Al Hasa (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 398 days.

(21) Appl. No.: 17/643,749

(22) Filed: Dec. 10, 2021

(65) Prior Publication Data

US 2023/0184431 A1 Jun. 15, 2023

(51) Int. Cl.
*F23G 7/08* (2006.01)
*B01D 19/00* (2006.01)
*F23K 5/00* (2006.01)

(52) U.S. Cl.
CPC ........... *F23G 7/08* (2013.01); *B01D 19/0042* (2013.01); *F23K 5/002* (2013.01); *F23G 2209/14* (2013.01)

(58) Field of Classification Search
CPC ... F23G 7/08; F23G 2209/14; B01D 19/0042; F23K 5/002

USPC ......................................................... 431/202
See application file for complete search history.

(56) References Cited

U.S. PATENT DOCUMENTS

| | | |
|---|---|---|
| 4,961,703 A | 10/1990 | Morgan |
| 9,709,266 B2 | 7/2017 | Aldrich |
| 11,655,755 B2 * | 5/2023 | Bromberg ........... F02D 41/0002 123/3 |
| 2013/0143170 A1 | 6/2013 | Krebber et al. |

FOREIGN PATENT DOCUMENTS

| | | |
|---|---|---|
| CN | 213955328 U | 8/2021 |
| WO | 2021101603 A1 | 5/2021 |

* cited by examiner

*Primary Examiner* — Vivek K Shirsat
(74) *Attorney, Agent, or Firm* — Osha Bergman Watanabe & Burton LLP (57) ABSTRACT

A system includes a gas plant having an inlet slug catcher, downstream processing equipment fluidly connected to the inlet slug catcher, and a downstream flare system fluidly connected to the inlet slug catcher. The system also includes an upstream plant connected to the inlet slug catcher via a transmission pipeline. The upstream plant includes an upstream flare system fluidly connected to the transmission pipeline, wherein the inlet slug catcher has a design pressure equal to or greater than the transmission pipeline design pressure.

4 Claims, 8 Drawing Sheets

INTEGRATED FLARE SYSTEM FOR GAS PLANT

BACKGROUND

Oil and gas processing facilities (or plants) include numerous equipment working together to process production fluids (e.g., oil, gas, water, etc.) extracted from a well to separate out key components in the recovered fluids and prepare them for export and use. Such processing plants use flare systems to relieve pressure in the system and to flare flammable gaseous waste from the process including, for example, flammable gases vented during planned startups, planned shutdowns, and unforeseen emergencies.

Figure 1:
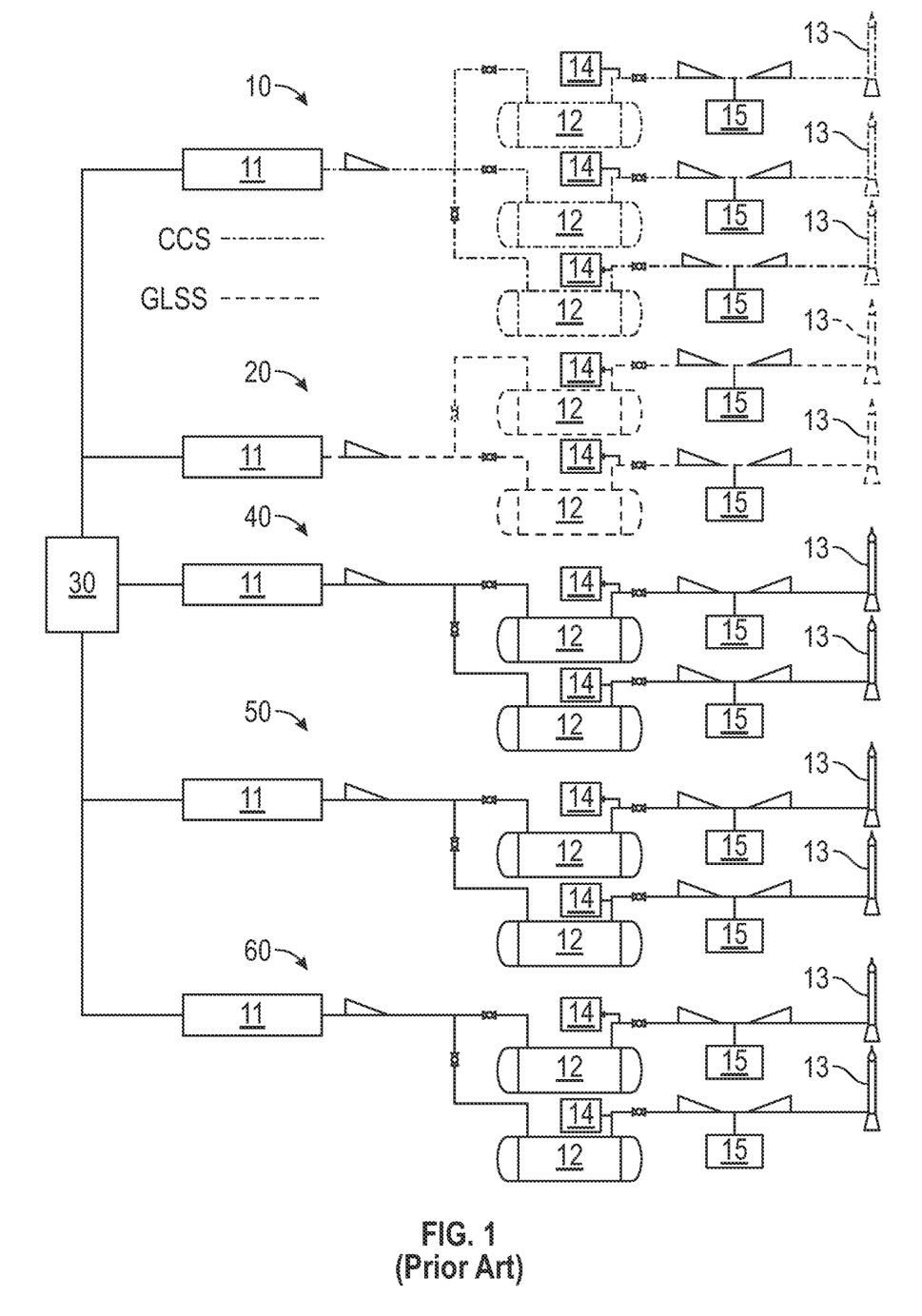
FIG. 1 shows an example of a conventional flare system.

FIG. 1 shows an example of a typical flare system used with a processing plant 30 including multiple flare subsystems 10, 20, 40, 50, and 60. Each flare subsystem 10, 20, 40, 50, 60 includes flare headers 11, which include a network of pipes that runs from the plant 30 and into a liquid knockout drum 12, to bring flammable gases from the plant processing equipment to the flare 13 (also known as a flare stack). Additionally, multiple flares 13 are typically used in a flare subsystem to allow one flare to be shut down without shutting down the entire plant. Purge or sweep gas may be flowed through the flare header 11 to prevent air ingress that could cause a flammable mixture within the flare header 11.

Knockout drums 12 may separate entrained liquid from the flare header gas stream to prevent the liquid from being flowed to the flare, which could catch fire at the flare ("burning rain"), extinguish the flame, or cause irregular combustion and smoking. Additionally, a drain drum 15 may be positioned along a line between the knockout drum 12 and the flare 13 to catch any liquids that may be entrained, condense, or otherwise accumulate as separated gas is flowed from the knockout drum 12 to the flare 13. Flowlines through the flare subsystems may be sloped (as indicated by the triangles along the flowlines), which may also be used to help direct the flow of accumulated liquids and prevent accumulated liquids from entering the flare 13.

Some of the gas separated from the knockout drum 12 may be recovered, compressed, and reused through a flare gas recovery (FGR) system 14. A FGR system may include compressors to compress the collected gas to a liquid, which may then be rerouted to the gas plant system (e.g., as fuel gas, refinery feedstock, etc.).

The flare subsystems 10, 20, 40, 50, 60 may include other flare system equipment to control the flow of fluids through the system and to prevent the potential for catastrophic failure, including, for example, flashback seal drums to prevent air ingress in the system by maintaining a positive backpressure in horizontal pipe sections of the system, valves, flow control devices, purge system equipment, purge reduction seals, pumps, and others. The flammable waste gases from the flare subsystems 10 may eventually be directed to the flares 13, where the waste gas may be burned (e.g., using a pilot light system).

The design and configuration of flare systems may depend on, for example, the type of equipment selected, and the process being flared. For example, different sizes and configurations of knockout drums (e.g., horizontal 2-inlet, 1-outlet knockout drums, horizontal 1-inlet, 1-outlet knockout drums, and vertical knockout drums) are available for use with different processing conditions, where the elevation of the knockout drum may decide the elevation and position of the flare header. Due to the number of flare system inputs and different combinations of flows through the system, the pressure and flow rate of fluids through a flare system may be difficult to plan for and control. To help with flare system design and safety, typical design standards for flare systems are outlined by regulatory and standards organizations such as the American Petroleum Institute (API) and the International Organization for Standardization (ISO).

Flare subsystems in a gas plant may be segregated by pressure rating (e.g., atmospheric pressure flare subsystems, low pressure (LP) flare subsystems, or high pressure (HP) flare subsystems) and/or may be segregated by service (e.g., acid gas flare subsystems, cold dry flare subsystems, or warm wet flare subsystems). For example, referring to FIG. 1, equipment in a gas plant 30 with a high design pressure rating may be connected to a HP flare subsystem 10, which may have high allowable back pressure in the system and reduced flare header sizes, while equipment in the gas plant 30 with a low design pressure may be connected to a LP flare subsystem 40, which may have low allowable back pressure and increased flare header sizes. Conventional flare systems also typically include a cryogenic flare subsystem 20, an acid gas flare subsystem 50, and an atmospheric flare subsystem 60. Separating the flare subsystems and designing them to connect with appropriate gas plant equipment is generally done for system efficiency, safety, and cost reduction.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to systems having a gas plant connected to an upstream plant. The gas plant may include an inlet slug catcher, downstream processing equipment fluidly connected to the inlet slug catcher, and a downstream flare system fluidly connected to the inlet slug catcher. The upstream plant may be connected to the inlet slug catcher via a transmission pipeline. The upstream plant may include an upstream flare system fluidly connected to the transmission pipeline, wherein the inlet slug catcher has a design pressure equal to or greater than the transmission pipeline design pressure.

In another aspect, embodiments disclosed herein relate to a gas plant having an integrated flare system that includes a high pressure flare subsystem and an integrated flare subsystem. The high pressure flare subsystem may include a high pressure flare header, a high pressure knockout drum connected to the high pressure flare header, and a high pressure flare connected to the high pressure flare knockout drum, wherein the high pressure flare has a design pressure of at least 75 psig. The integrated flare subsystem may include an integrated flare header fluidly connected to two different types of separating equipment and an integrated knockout drum connected to the integrated flare header, and a low pressure flare connected to the integrated knockout drum, wherein the low pressure flare is configured to contain a gas pressure less than 50 psig In yet another aspect, embodiments disclosed herein relate to methods for constructing a gas processing system that may include determining an upstream design pressure of a transmission pipeline connected to an upstream plant having an upstream flare system, providing inlet equipment in a downstream plant having a design pressure that is equal to or greater than the upstream design pressure, and connecting the inlet equipment to the transmission pipeline to connect the upstream plant to the downstream plant.

Other aspects and advantages will be apparent from the following description and the appended claims.

BRIEF DESCRIPTION OF DRAWINGS

Wherever possible, like or identical reference numerals are used in the figures to identify common or the same elements. The figures are not necessarily to scale and certain features and certain views of the figures may be shown exaggerated in scale for purposes of clarification.

DETAILED DESCRIPTION

Embodiments of the present disclosure are described below in detail with reference to the accompanying figures. In the following detailed description, numerous specific details are set forth in order to provide a more thorough understanding of the claimed subject matter. However, it will be apparent to one having ordinary skill in the art that the embodiments described may be practiced without these specific details. In other instances, well-known features have not been described in detail to avoid unnecessarily complicating the description.

Embodiments disclosed herein relate generally to flare integration and reduction systems for gas plants. Flare integration and reduction systems and methods described herein may minimize the amount of flaring from a gas plant and reduce capital equipment cost by using one or more flare integration and reduction aspects described herein. Flare integration and reduction aspects described herein may include, for example, plant-to-plant flare integration, flare-to-flare integration, utilizing pipeline survivability, and inert gas blanketing, where various aspects may be used alone or in combination to reduce the overall flaring from a gas processing system.

For example, plant-to-plant flare integration processes and systems may include inlet equipment in a downstream plant that is designed to allow flaring to be shifted from flaring at the downstream plant to flaring at a connected upstream plant, e.g., by designing the inlet equipment to have the same pressure rating as a transmission pipeline connecting the downstream plant to the upstream plant. When the inlet equipment of the downstream plant has the same pressure rating as the transmission pipeline, if there is an upset or stoppage at the downstream plant, fluid may be stored in the transmission pipeline utilizing a transmission pipeline survivability volume, and residual flaring may be performed at the upstream plant flare system. In such manner, the downstream plant flare system may be integrated with the upstream plant flare system. Additionally, by using upstream transmission pipelines as a storage volume during emergency (pipeline survivability) to store gas that would have conventionally required flaring at the inlet equipment of the downstream plant, overall flaring from the system may be reduced.

Because equipment designs allowing for plant-to-plant integration may direct flaring to the upstream plant that would have otherwise been flared at the downstream plant, flare subsystems in the downstream plant may be optimized by reducing the size of the HP flare system and further integration according to flare-to-flare integration aspects described herein, where a high pressure (HP) flare subsystem may be integrated with a low pressure (LP) flare subsystem and acid gas (AG) flare sub-system. For example, in conventional gas processing systems, HP flare subsystems in downstream plants would be designed to match the inlet feed capacity of the downstream plant so gas could be flared through the HP flare subsystem if there was an upset (e.g., a blocked outlet) at the inlet equipment of a downstream plant. By designing the inlet equipment of the downstream plant to achieve plant-to-plant integration (e.g., where the downstream inlet equipment and transmission pipeline have the same pressure rating), gas that would have been directed to a downstream HP flare subsystem in the event of an upset may instead by stored in the transmission pipeline and/or flared at the upstream plant flare system. This may allow for a reduced HP flare size for a downstream plant HP flare subsystem. Due to the reduced HP flare size requirements, to further reduce the overall flaring needs of the plant, or to enhance the flaring efficiencies/designs at the plant, the HP flare system may be integrated with other flare systems of the downstream plant using flare-to-flare integration aspects described herein. According to embodiments of the present disclosure, plant-to-plant integration and flare-to-flare integration may be independently applied to a system (e.g., where a system may have one of plant-to-plant integration or flare-to-flare integration) or plant-to-plant integration and flare-to-flare integration may be jointly used in a system (where a system may have both plant-to-plant integration and flare-to-flare integration).

Additional reduction in flare system requirements may be realized by using inert gas blanketing rather than conventional combustible gas (e.g., hydrocarbon) blanketing.

Various aspects for flare integration and reductions systems are described in more detail below, including plant-to-plant flare integration, flare-to-flare integration, utilizing pipeline survivability, and exchanging combustible gas (e.g., hydrocarbons) with inert gas to provide inert gas blanketing.

Plant-to-Plant Integration

When processing gas or other fluids (e.g., sour gas, sales gas, field gas, or other hydrocarbons produced from an oil and gas well), processing systems may include performing multiple processing steps utilizing multiple plants. A gas processing system may take in gas (and other fluids) from a reservoir and process the retrieved fluids to produce one or more desired components of the fluids (e.g., methane and other light gases, ethane, propane, or other heavier gases). Upstream plants in a gas processing system may receive and store retrieved fluids from a reservoir and perform initial separations of the fluids. Gases from upstream plants may be transferred to downstream plants, which may utilize different methods for splitting gas into useful or desired products. Plants may be separated from each other and defined within a battery limit (often identified on plant plans as "B/L"), which bounds the area where the plant equipment is located. Plants may be separated using battery limits for safety purposes, where isolation or shut down of a plant may be easily confirmed at the battery limits.

For example, a downstream gas plant may be fed by a separately located upstream plant, such as a gas compression plant (GCP), a gas oil separation plant (GOSP) or gas liquid separation plant (GLSP). A GCP may direct field gas through an inlet scrubber, remove entrained liquids, and compress and cool the processed gas. As the pressure is increased and temperature reduced, liquid in the gas may be condensed and collected. A GLSP refers to a plant that separates wellhead fluids into constituent gas and liquid (e.g., oil or water) components. Gas separated from a GCP, GLSP, or other upstream plant may be sent to the downstream gas plant for further processing via transmission pipeline. For example, in some embodiments a sour gas (e.g., a gas such as natural gas containing more than 4 ppm by volume of hydrogen sulfide ($H_2S$) under standard temperature and pressure) may be flowed through a transmission pipeline from an upstream plant to a downstream gas plant.

Different plants in a gas processing system may each have individual flare systems that flare various waste products from the different processes in the system and relieve built up pressure that may occur during shut down, start up, or system failure. In order to ensure the flare systems in a gas plant are capable of relieving pressure and disposing any waste that may be directed therethrough in a safe and effective manner, design of the flare system capacity may include consideration of pressure in the flare system headers, knockout drums, and tailpipes, flow rates and vibration limits in the pipes, liquid handling capability (e.g., drain rates), and radiation limits from the flare. Additionally, flare systems may be designed to prevent critical overpressure in the system due to blocked outlets (e.g., due to plugging of solids build-up from the fluids flowing therethrough, shutdown of a downstream equipment such as a pump, or inadvertent valve closure), and thus blocked outlets may be considered when designing flare system capacity.

According to embodiments of the present disclosure, a gas processing system may include a flare system that is integrated with both an upstream plant and a downstream plant. A flare system may be integrated with both an upstream plant and a downstream plant by rating a portion of downstream plant inlet equipment (e.g., at least one of an inlet slug catcher, an inlet knockout drum, and associated piping and valves) to have a greater or equal pressure rating as the transmission pipeline from the upstream plant. During any upset or emergency in the downstream plant, a portion of the gas flowing through the transmission pipeline may be stored in the transmission pipeline using a transmission pipeline storage volume, and any residual flaring may be performed using an upstream flare system in the upstream plant. In such manner, operation of the upstream flare system in the upstream plant may be dependent on (e.g., integrated with) operation of the downstream plant.

For example, in a plant-to-plant integrated flare system, a transmission pipeline may connect an upstream plant to inlet equipment in a downstream plant, where the transmission pipeline and downstream plant inlet equipment have the same design pressure rating (or the downstream plant inlet equipment may have a design pressure rating greater than the transmission pipeline). If there is an upset in the downstream plant inlet equipment, the flow path of gas through the downstream plant may be closed while the upstream plant is still online directing more gas to the transmission pipeline. Examples of upsets/overpressure scenarios include, a blocked outlet, valve closure, shutdown of a compressor associated with an inlet slug catcher in the downstream plant, overfilling, cooling water loss, reflux failure at tower overhead or side, loss of absorbent, accumulation of non-condensables, accidental mixing, failure of automatic controls, abnormal heat or vapor input, exchanger tube rupture or leak, internal explosion or pressure surge, chemical reaction, solar or thermal expansion, exterior fire, power failure, cooling water failure, steam failure, instrument air failure, and others.

Pressure from blocked gas in the transmission pipeline may begin to increase, and the increasing amount of gas in the transmission pipeline may be compressed and stored in the transmission pipeline up to the maximum ullage capacity of the transmission pipeline, as determined by the design pressure of the transmission pipeline. As used herein, the design pressure of equipment (such as a transmission pipeline) refers to the amount of pressure the equipment can handle before an associated relief valve set point is reached. When the ullage capacity of the transmission pipeline is fully utilized (filled with the stored gas), gas continuing to flow from the upstream plant may be flared by an upstream flare system in the upstream plant (rather than flaring at an inlet flare system in the downstream plant).

Such configuration may eliminate the conventional requirement to design a HP flare subsystem in the downstream plant to match the downstream plant inlet feed capacity in order to deal with a blocked outlet at the downstream plant inlet equipment. In addition, because the upstream transmission pipelines may be used as a storage volume during emergency at the downstream plant (in contrast to conventional configurations requiring flaring at the inlet equipment of the downstream plant), integrated plant-to-plant flare systems disclosed herein may minimize flaring, and thus also the carbon footprint of the gas processing system.

Figure 2:
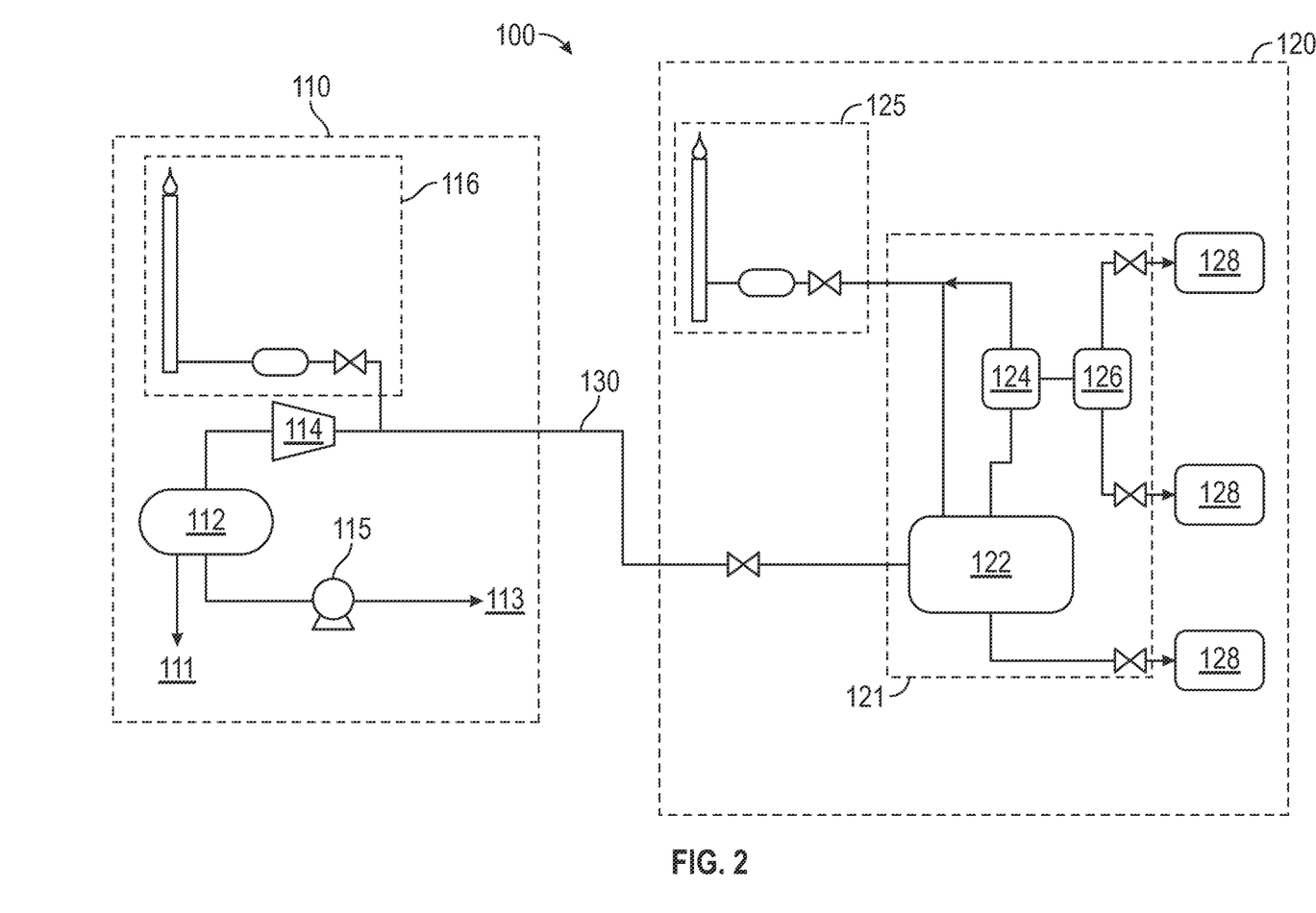
FIG. 2 shows a gas processing system having a plant-to-plant integration according to embodiments of the present disclosure.

For example, FIG. 2 shows an example of a gas processing system according to embodiments of the present disclosure that includes an integrated plant-to-plant flare system 100, where an inlet portion 121 of a downstream plant 120 (e.g., a gas plant) is designed to allow shifting of flaring from the downstream plant 120 to a connected upstream plant 110 (e.g., a GCP). Equipment in the inlet portion 121 may include at least one of an inlet slug catcher 122, a booster compressor knockout drum 124, a compressor 126, piping and valves connecting the inlet equipment, and/or others. Plant-to-plant integration according to embodiments of the present disclosure may be achieved by designing the design pressure rating of inlet equipment within the inlet portion 121 of the downstream plant 120.

The upstream plant 110 may include various equipment located within the plant's battery limit, including, for example, a separator (e.g., an inlet scrubber) 112, which may separate entrained liquids and solids from a gas stream, a compressor 114, and flare equipment in an upstream flare system 116 (e.g., including multiple flare subsystems having multiple flares, knockout drums, compressors, valves, and other pressure regulating equipment). Liquids 111 and condensates 113 from the separator 112 may be disposed of or pumped (via pump 115) to another processing stage. Processed gas may be directed from the upstream plant 110 to the downstream plant 120 via a transmission pipeline 130.

Figure 8:
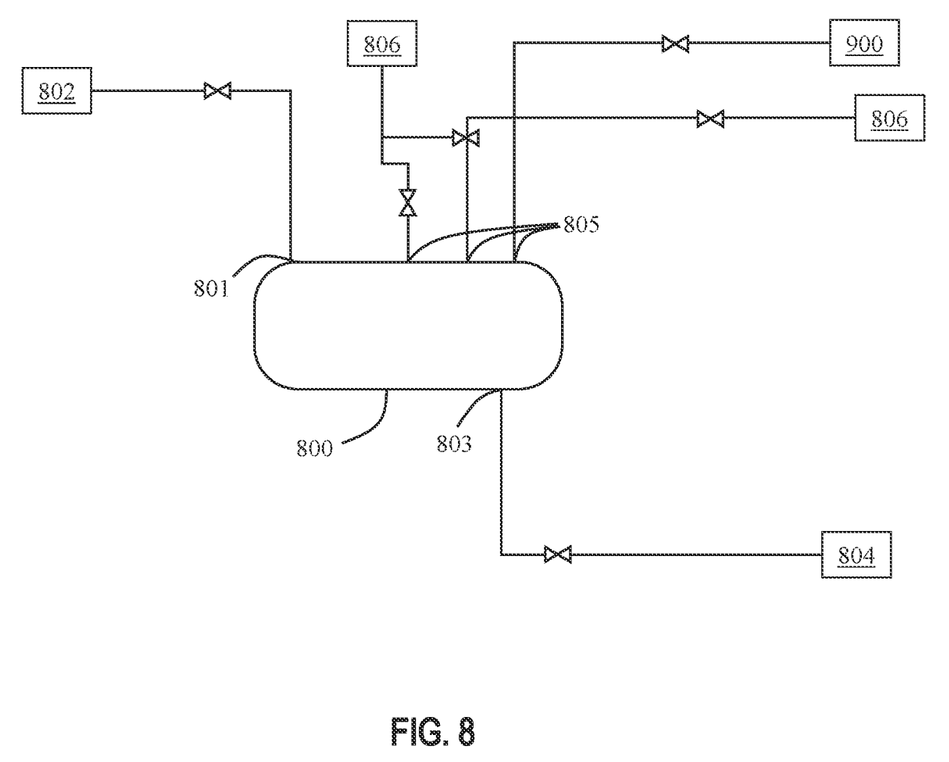
FIGS. 8 and 9 show examples of inlet equipment according to embodiments of the present disclosure.
Figure 9:
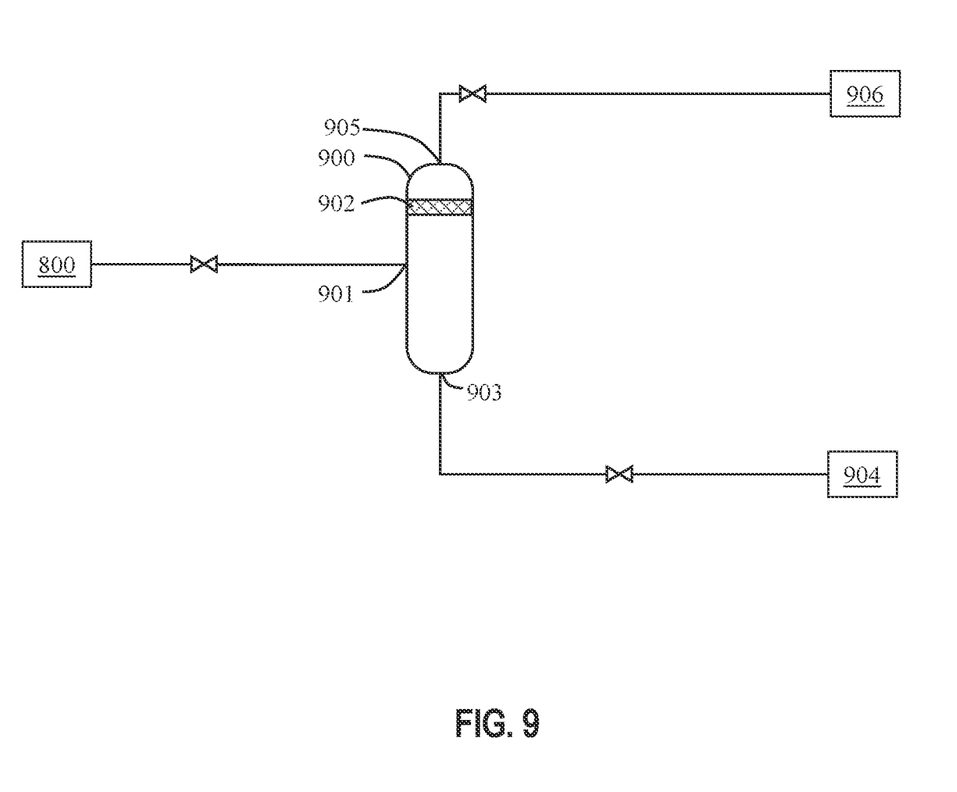

Gas from the transmission pipeline 130 may enter an inlet slug catcher 122 in an inlet portion 121 of the downstream plant 120. Gas may then be directed from the inlet slug catcher 122 to a booster compressor knockout drum 124, which is a secondary tank that may catch entrained liquids that may be present in the gas from the slug catcher 122. The gas from the booster compressor knockout drum 124 may then be flowed to a compressor 126, where the gas may be compressed before being directed to different downstream processing equipment 128. The inlet equipment in the inlet portion 121 may be located within the battery limits of the downstream plant 120 between the outlet of the transmission pipeline 130 and other processing equipment 128 in the downstream plant 120. Examples of inlet equipment (e.g., an inlet slug catcher, a booster compressor knockout drum, and a compressor) are shown in FIGS. 8 and 9 and described in more detail below.

An inlet slug catcher 122 may be used to collect fluids that have settled in flow lines (slugs) which can overload the gas/liquid handling capacity of the plant. In such manner, a slug catcher may help protect expensive production equipment in the system from abrupt large bursts of fluids entering the gas stream. In other words, a slug catcher may provide extra capacity to accept a kick in pressure from slugs in a gas stream and to prevent liquid flow to the downstream compressor. Thus, the inlet slug catcher 122 may include a vessel having a volume capable of storing multiple liquid slugs or the largest slugs expected from the transmission pipeline 130.

A downstream flare system 125 for the downstream plant 120 may be connected to components in the downstream plant 120 (e.g., the inlet slug catcher 122) to receive and flare waste gases from the components. Although a simplified diagram of only one flare subsystem is shown in the downstream flare system 125 in FIG. 2, a downstream flare system 125 may include multiple flare subsystems (e.g., as described herein), where each flare subsystem may include one or more flares, one or more knockout drums, and a system of piping and valves or other flow control devices.

According to embodiments of the present disclosure, the flare systems and flaring requirements of the upstream plant 110 and the downstream plant 120 may be integrated by "over-designing" the initial components in an inlet portion 121 of the downstream plant 120 initially receiving and processing feed from the upstream plant 110. For example, the inlet slug catcher 122, booster compressor knockout drum 124, associated piping, valves, and other components, may have a similar design pressure as the transmission pipeline 130.

If there is a process failure or severe upset in the downstream plant 120, the inlet equipment (having the higher or same design pressure) may be isolated from downstream components, and when the storage capacity of these components is reached, a backpressure may be applied to the transmission pipeline 130. For example, by providing the inlet slug catcher 122 with the same (or greater) design pressure as the transmission pipeline 130, backpressure from the inlet slug catcher 122 may be handled by the transmission pipeline 130 design pressure. In cases where the ullage capacity of the transmission pipeline 130 is fully utilized, gas may be flared through the upstream flare system 116 in the upstream plant 110 to relieve gas transmission through the transmission pipeline 130. In contrast, conventional gas plant systems may use an independent HP flare subsystem connected to the downstream plant inlet equipment and designed to match the inlet feed capacity of the inlet equipment, where gas from an upset at the inlet equipment would be flared.

Thus, by using gas processing system designs according to embodiments of the present disclosure, where a relatively larger amount of fluid storage may be provided in an inlet slug catcher 122 to a gas plant (when compared with conventional inlet slug catcher having a lower design pressure), a HP flare subsystem in a downstream flare system 125 for the gas plant may be designed for a reduced capacity. For example, as discussed more below, an HP flare subsystem in a downstream gas plant integrated with the flare system of a connected upstream plant in a plant-to-plant integration may have a reduced HP flare header, a reduced number of HP flare knockout drums, and a reduced number of HP flare stacks.

Additionally, plant-to-plant flare integration according to embodiments of the present disclosure may eliminate high pressure (HP) and low pressure (LP) interfaces between the upstream plant 110 and the downstream plant 120. HP/LP interfaces between the connected upstream and downstream plants may be eliminated by providing the downstream plant inlet equipment, such as the inlet slug catcher 122 and inlet booster compressor knockout drum 124, which is connected to the downstream flare system 125, with a design pressure (relief valve set point) that is equal to the design pressure of the transmission pipeline from the upstream plant (connected to the upstream flare system 116). Consequently, gas processing systems with integrated flare systems according to embodiments of the present disclosure may be constructed by re-rating the inlet slug catcher 122, inlet booster compressor knockout drum 124, and/or associated piping and valves (e.g., piping and valves controlling fluids into and out of the inlet slug catcher 122 and/or booster compressor knockout drum 124) to have a design pressure equal to or greater than the design pressure of the transmission pipeline 130. The design pressure of inlet equipment in a downstream plant may be designed, for example, by altering the wall thickness of one or more flow paths through the inlet equipment. For example, the wall thickness of tanks, valves, and/or piping of inlet equipment may be increased to increase the design pressure rating of the inlet equipment. Design pressure of any pressure equipment may be determined in accordance with ASME (American Society of Mechanical Engineers) Section VIII, Division 1 or 2 requirements, which results to a particular wall thickness for a given material. Hence, an increase in design pressure for a given equipment unit may be achieved by increasing the wall thickness of the equipment during design in accordance with ASME VIII requirements. Although thicker (and thus heavier) inlet equipment may have a higher capital cost than conventional inlet equipment, such additional cost may be much less than what is saved by the reduced HP flare subsystem design capacity needed.

By designing at least a small portion of the inlet equipment in a downstream plant to have the same design pressure as the transmission pipeline from the outlet of a connected upstream plant, thereby removing HP/LP interfaces at the inlet to the downstream plant, an integrated plant-to plant flare system may be achieved. Further optimization of the downstream flare system can be achieved by utilizing a flare-to-flare integration, described below.

Flare-to-Flare Integration

According to embodiments of the present disclosure, an integrated flare system may have a reduced number of flare subsystems compared with conventional gas plant flare systems by integrating compatible pressure rated subsystems and materials together in an integrated flare subsystem. For example, an integrated flare subsystem may include an integrated flare header that is fluidly connected to two or more different types of separating equipment, for example, LP equipment used for low pressure hydrocarbon processing, acid gas equipment used for processing acid gas (e.g., a natural gas or other gas mixture containing significant amounts of acidic gases such as carbon dioxide or hydrogen sulfide), and HP equipment used for high pressure hydrocarbon processing. LP equipment may include, for example, hydrocarbon systems with design pressure below 150 psig such as water-oil separation packages (WOSEP), condensate stabilization equipment, etc. Acid gas equipment may include, for example, equipment within sulfur recovery units (SRU), acid gas removal units (AGRU), and condensate stabilization units. HP equipment may be in hydrocarbon systems with design pressure above 150 psig and include equipment such as inlet separation systems, gas compression systems, dehydration systems, mercury removal systems, etc. Relief, blowdown. and operational venting from these LP equipment, acid gas equipment, and HP equipment may be routed to the integrated flare-to-flare integration subsystem. Piping and equipment material selected for the construction of an integrated flare-to-flare system may be compatible to handle both acid gas and LP and HP gas fluid simultaneously.

An outlet of the integrated flare header may be connected to an inlet of an integrated knockout drum, which may separate liquids and gases from different fluids being processed. An LP flare may be fluidly connected to an outlet of the integrated knockout drum, e.g., via an outlet line and one or more valves or other flow control devices. The minimum design pressure for the integrated flare system may be 50 psig, which may be compatible with both the connected LP equipment and the acid gas equipment. Further, the integrated flare system may be sized and designed to perform either acid gas flaring or flaring from a LP or HP system, including assist gas as required to boost the heating value of the acid gas.

Additionally, by modifying the design pressure of inlet equipment in a downstream plant to equal the design pressure of the outlet from a connected upstream plant in a plant-to-plant integration, as described above, gas flowing from the connected upstream plant may be rerouted to be flared in the upstream plant flare system rather than to a HP flare subsystem in the downstream plant. Accordingly, an integrated flare system in the downstream plant may be designed to include a HP flare subsystem having a smaller size, which may include a reduced HP flare capacity, a reduced HP flare header size (e.g., a reduction of over 30 percent), a reduction in the number of HP flares by half, and a reduction in the number of knockout drums by half.

Figure 3:
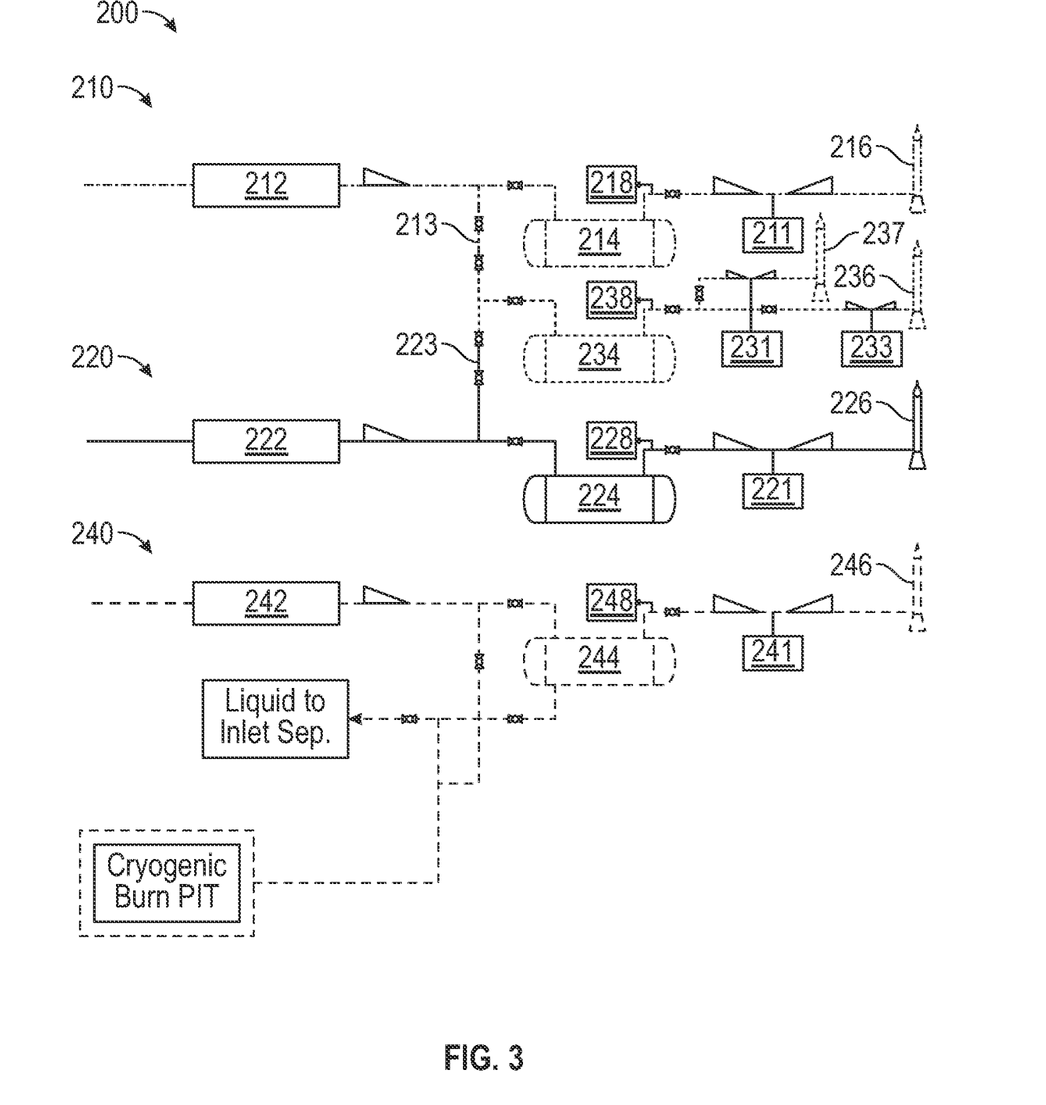
FIG. 3 shows an integrated flare system having flare-to-flare integration according to embodiments of the present disclosure.

FIG. 3 shows an example of an integrated flare system 200 according to embodiments of the present disclosure. The integrated flare system 200 may include a HP flare subsystem 210 that may be connected to and flare gases from high pressure equipment (e.g., an inlet slug catcher, other inlet separation system equipment, gas compression system equipment, dehydration system equipment, and mercury removal system equipment) having a design pressure above 150 psig.

The HP flare subsystem 210 may include a HP flare header 212, a HP knockout drum 214 connected to the HP flare header 212, and a HP flare 216 connected to the HP flare knockout drum 214. HP knockout drums 214 used in a HP flare subsystem 210 may have a design pressure of at least 50 psig, at least 75 psig, at least 100 psig, or at least 150 psig and be constructed of a low temperature carbon steel (whereas LP or AG knockout drums may have a design pressure of 50 psig or less and carbon steel material construction). The HP flare stack 216 may have a design pressure of at least 75 psig (e.g., 100 psig) and may be designed for sonic flaring, e.g., include a sonic flare tip (whereas an integrated LP or AG flare stack may have a design pressure of 50 psig or less and be designed for sub-sonic flaring, e.g., include a sub-sonic flare tip).

The HP flare subsystem 210 may be designed to have a reduced capacity and sizing when compared with conventional HP flare systems. In some embodiments, the HP flare header 212 may be designed to have a capacity that is less than the capacity of the connected high-pressure equipment (e.g., an inlet slug catcher).

In some embodiments, the HP flare header 212 size may be reduced by 30%-50% in diameter because of the reduced flaring capacity resulting from re-rating a portion of the inlet equipment design pressure and using relief valves such as bellow and pilot type valves with higher back pressure tolerance.

Additionally, the number of HP flares 216 used in the HP flare subsystem 210 may be reduced from 2 to 1, and the number of HP knockout drums 214 used in the HP flare subsystem may be reduced from 2 to 1, because of the reduced flaring capacity resulting from re-rating a portion of the inlet equipment design pressure.

A flare gas recovery system 218 may also be connected to the HP flare knockout drum 214 (e.g., via a valve along an outlet line from the HP flare knockout drum 214). The flare gas recovery system 218 may be used to collect waste gases that would otherwise be flared, compress the collected gas (e.g., using liquid compressors), and redirect the recovered gases for reuse in the gas plant's fuel system, as feedstock, or other use. Additionally, a drain drum 211 may be fluidly connected to an outlet of the HP flare knockout drum 214, where the drain drum 211 may receive liquids that may be entrained, condense, or otherwise accumulate within the flow line between the upstream HP flare knockout drum 214 and the flare 216.

The integrated flare system 200 may also include an integrated flare subsystem 220, which may be formed of an integrated flare header 222, an integrated knockout drum 224 connected to the integrated flare header 222, and a LP flare 226 connected to an outlet of the integrated knockout drum 224. The integrated flare header 222 may be fluidly connected to two different types of gas processing systems and may direct fluids from the different gas processing systems to an inlet of the integrated knockout drum 224. For example, the integrated flare header 222 may be fluidly connected to a LP gas processing system and an acid gas processing system, e.g., through tailpipes and sub-headers fluidly connected to different process segments in the systems. LP gas and acid gas from the LP gas processing system and acid gas processing system may be flowed through the integrated flare header 222 to the integrated knockout drum 224 simultaneously during emergency or one at a time during operational turnaround and inspection (T&I) flaring. The materials used to construct the equipment may include, for example, carbon steel (e.g., HIC and PWHT), and may be selected to be compatible with the expected fluid flowing therethrough. Material selection may also be based on the header size, which may be sized to accommodate the worst case back pressure compatible to the system design pressure and the relief valves back pressure tolerance.

An integrated flare header 222 may be connected to LP equipment in the LP gas processing system that has a design pressure of less than 150 psig and acid gas equipment in the acid gas processing system that has a design pressure of less than 150 psig. Thus, by providing the integrated flare subsystem with a design pressure of at least 50 psig, the integrated flare subsystem may be compatible with both the connected LP equipment and acid gas equipment.

The LP flare 226 may be connected to an outlet of the integrated knockout drum 224 (e.g., via at least one outlet line, valve, and other flow control device). The LP flare 226 may contain a gas pressure less than 50 psig when flaring gases from the integrated knockout drum 224.

A flare gas recovery system 228 may also be connected to the integrated knockout drum 224 (e.g., via a valve along an outlet line from the integrated knockout drum 224). The flare gas recovery system 228 may be integrated with flare gas recovery systems 218, 238, 248 of other flare subsystems to process hydrocarbon gas recovered from the subsystems (e.g., the HP, LP/AG, and cryogenic subsystems). Additionally, a second drain drum 221 may be fluidly connected to an outlet of the integrated knockout drum 224, where the second drain drum 221 may receive drained liquids from the upstream integrated knockout drum 224 to drain from the system.

The integrated flare system 200 may also include a second integrated knockout drum 234 fluidly connected to both the HP flare header 212 and the integrated flare header 222 via transfer lines 213, 223. Fluid may be directed from either the HP flare header 212 or the integrated flare header 222 by opening and closing one or more valves on the transfer lines 213, 223. Thus, the second integrated knockout drum 234 may be capable of collecting and separating entrained liquids from HP and LP gases. The design pressure ratings for the HP flare knockout drum 214 and the second integrated knockout drum 234 may be designed to be similar, such that the second integrated knockout drum 234 may operate at HP or LP. Additionally, the valving along transfer lines 213 and 223 may be coordinated, as flaring requirements are needed, to direct fluid flow to the appropriate flaring system to meet the flaring requirements. The second integrated knockout drum 234 may have the same design pressure and be formed of the same material as the HP flare subsystem, such that the second integrated knockout drum 234 may be used for HP flaring or LP/AG flaring when the duty of the HP knockout drum 214 is under T&I or the duty of the LP/AG knockout drum 224 is under T&I.

A second HP flare 236 and a second LP flare 237 may be connected to an outlet of the second integrated knockout drum 234. Further, additional drain drums 231, 233 may be provided along the lines to the second HP flare 236 and second LP flare 237 to drain fluids collected from the system, and a flare gas recovery system 238 may be fluidly connected to an outlet of the second integrated knockout drum 234 to collect some of the gas processed in the second integrated knockout drum 234 rather than flaring.

According to embodiments of the present disclosure, an integrated flare system 200 may also include a cryogenic flare subsystem 240, which may be used to flare fluids with non-freezable components and fluids with a low operating temperature. Due to the potential for low operating temperatures, cryogenic flare subsystems may have different metallurgical requirements, along with proper pressure, temperature, and other design considerations. For example, equipment in the cryogenic flare subsystem 240 may be made of stainless steel, while the other flare subsystems may have equipment made of carbon steel. The cryogenic flare subsystem 240 may be separate from (not connected to) the HP and integrated flare subsystems 210, 220.

The cryogenic flare subsystem 240 may include a cryogenic flare header 242 fluidly connected a cryogenic fluid processing system (e.g., including cryogenic equipment in hydrocarbon systems such as propane system equipment and natural gas liquids (NGL) recovery system equipment with design temperatures of −48° F. or lower). The cryogenic flare header 242 may also be fluidly connected to an inlet of a cryogenic knockout drum 244. Recovered cryogenic liquid from the cryogenic knockout drum 244 may be recirculated back to the beginning of the process (e.g., to the inlet separator) for further processing during normal operation or can be routed to a cryogenic burn pit in the case of emergency. During T&I of the single cryogenic knockout drum 244, cryogenic flaring may be re-routed to the burn pit in order to avoid shut-down of the gas plant.

The cryogenic knockout drum 244 may be used to separate liquids and gases from a fluid flowing through the cryogenic knockout drum 244. For example, in some embodiments, a cryogenic knockout drum 244 may separate natural gas liquid (NGL).

Gases separated from the cryogenic knockout drum 244 may be flowed to a connected cryogenic flare 246 or to a flare gas recovery system 248 (e.g., via an outlet line, one or more valves, and other flow control devices). The cryogenic flare 246 may contain a gas pressure less than 100 psig when flaring. In some embodiments, the cryogenic flare subsystem 240 may flare to a dry flare (e.g., 246) and the other flare subsystems 210, 220 in the integrated flare system 200 may flare to a wet flare (e.g., 216, 226, 236).

The cryogenic flare subsystem 240 may also include a cryogenic drain drum 241 fluidly connected to an outlet of the cryogenic knockout drum 244, where fluids from the cryogenic knockout drum 244 may be drained from the system through the cryogenic drain drum 241.

By using integrated flare systems according to embodiments of the present disclosure, co-incident flaring of HP and LP flares (and thus cumulative radiation from the multiple flare stacks) may be avoided, which may reduce the flare plot area of the system. Flare plot areas represent incident radiated heat from a flare at different locations surrounding the flare. According to embodiments of the present disclosure, integrated flare systems may have a flare plot area reduced by at least 30 percent when compared with flare systems having co-incident flaring of HP and LP flares.

Figure 4:
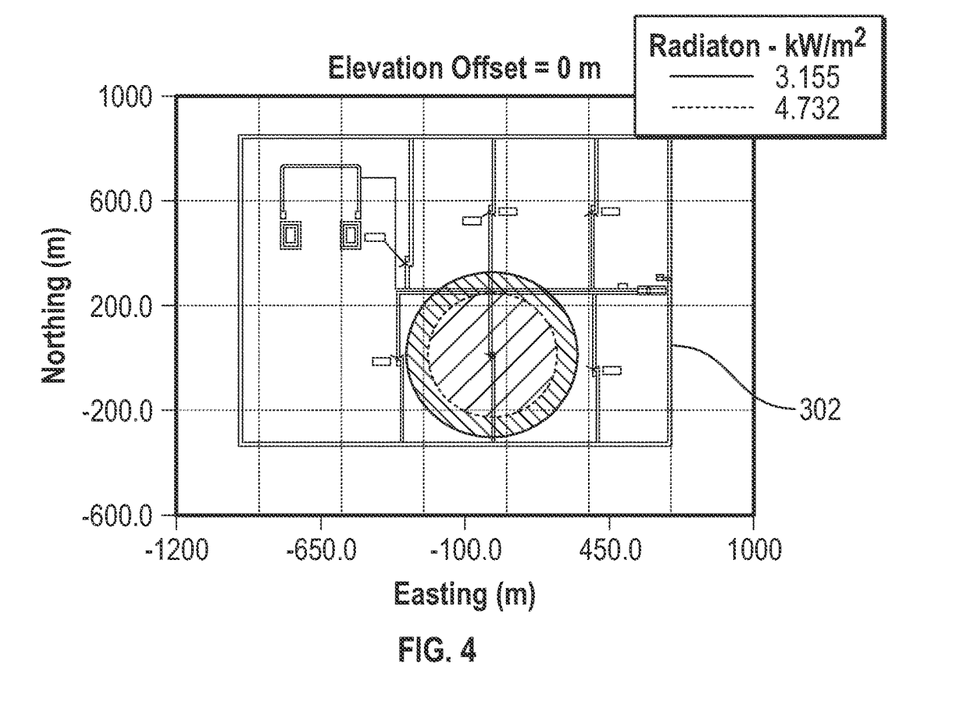
FIGS. 4-6 show example isopleths representing the intensity of heat radiated from a HP flare in an integrated flare system according to embodiments of the present disclosure at different elevations.
Figure 5:
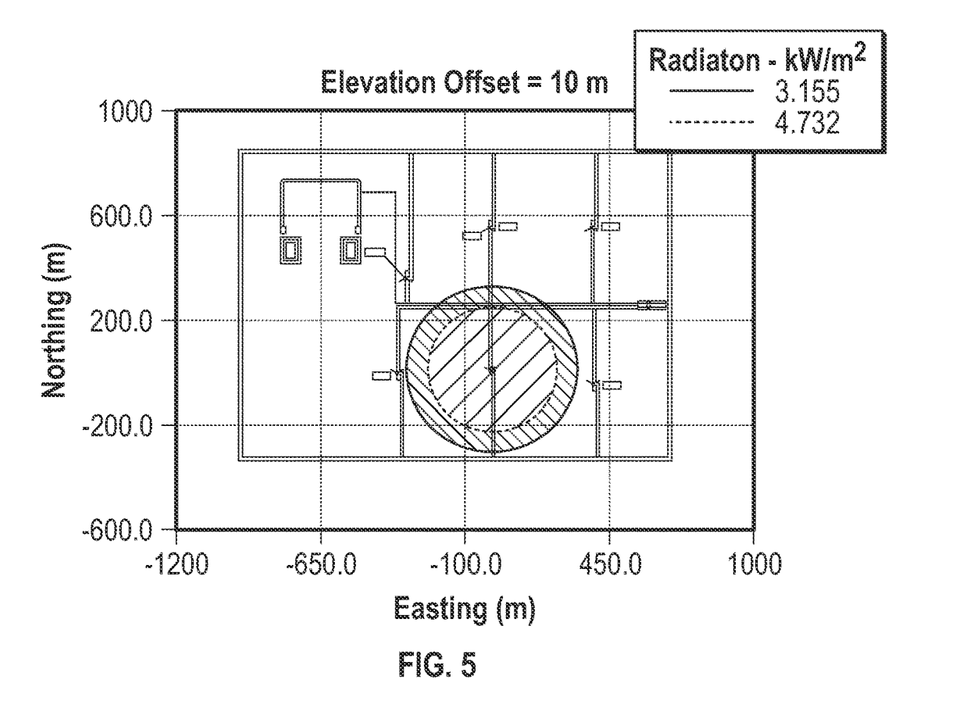
Figure 6:
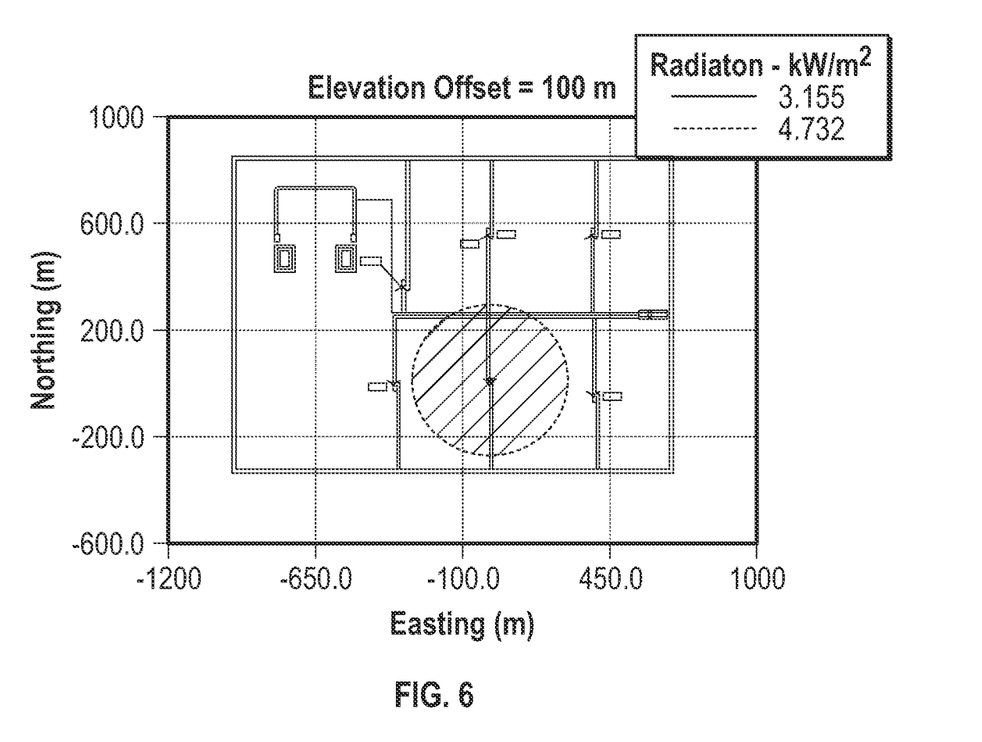

FIGS. 4-6 show example isopleths representing the intensity of heat radiated from a HP flare in an integrated flare system according to embodiments of the present disclosure. The isopleths in FIGS. 4-6 show the flare plot areas when the system is operating with the maximum relief rate to the HP flare (e.g., due to a blocked gas export line). In some embodiments, a T&I flare stack (which may have the same duty as the HP flare) may be provided as a maintenance flare stack, which may be used when the HP flare is under maintenance (such that only one of the flares is online at a time).

FIG. 4 shows a ground level isopleth of the HP flare in an integrated flare system according to embodiments of the present disclosure, where the flare plot area meets a criterion of radiation at a fence line 302 of 3.2 kW/m$^2$ or less.

FIG. 5 shows an isopleth of the radiation from the HP flare at an elevation around the central pipe rack (which may be at an elevation of around 10 m). The isopleth shows that the flare radiation meets a second criteria of radiation at the central pipe rack elevation of 4.7 kW/m$^2$ or less.

FIG. 6 shows an isopleth of the radiation from the HP flare at an elevation adjacent to the flare tip. The isopleth shows that the flare radiation meets a third criteria of radiation at the flare tip elevation of 4.7 kW/m$^2$ or less.

Inert Gas Blanketing

According to embodiments of the present disclosure, plants may be designed to have a gas blanketing system using an inert gas. A gas blanketing system according to embodiments of the present disclosure may include one or more inert gas sources and a system of connections (e.g., pipes and valves) for distributing inert gas to one or more tanks in the plant. A gas blanketing system according to embodiments of the present disclosure may be used to fill empty space in one or more liquid storage tanks in the plant with inert gas. Conventionally, gas plants have used methane as a blanketing gas, as methane is typically most readily available. However, by bringing in an inert gas, such as nitrogen, to blanket tank(s) in a gas plant, the cost of the inert gas may be lower than the cost of extra flaring from using methane (or other hydrocarbon gas), and the carbon footprint of the system may be reduced.

Figure 7:
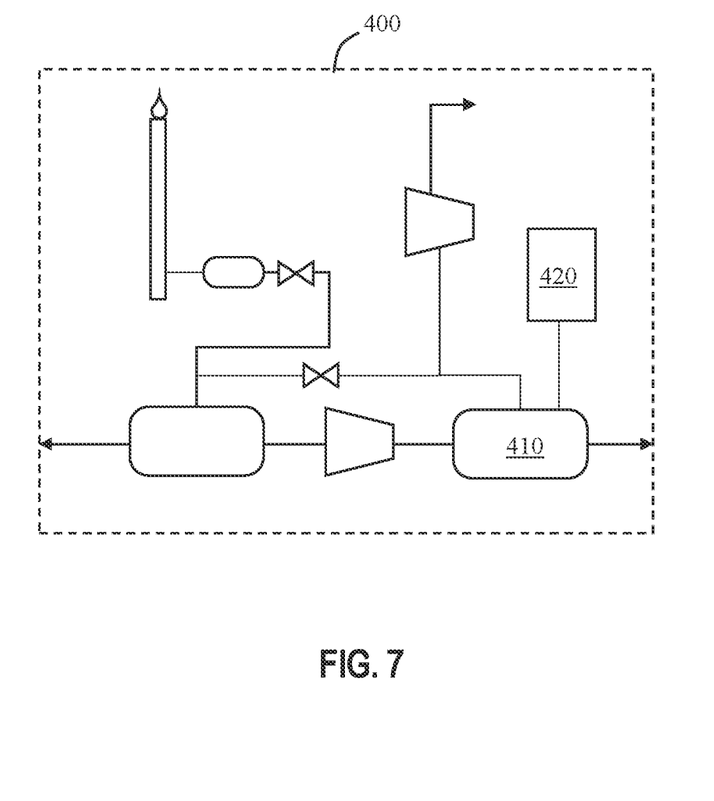
FIG. 7 shows a gas plant using an inert gas blanketing system according to embodiments of the present disclosure.

For example, FIG. 7 shows an example of a gas plant 400 that includes equipment for processing a gas. Gas processing equipment may include, for example, separating equipment (e.g., separators, knockout drums, etc.), storage tanks 410, flow lines between the different equipment, and valves and other flow control devices positioned along the flow lines. At least one inert gas source 420 may be provided at the gas plant 400 (e.g., in an inert gas tank) and fluidly connected to one or more equipment units that store fluids from the gas processing, such as storage tanks 410. Equipment that may be blanketed with inert gas may include, for example, amine storage tanks, methanol storage tanks, triethylene glycol (TEG) storage tanks, and others. Additionally, the gas blanketing system may be used to provide inert gas blanketing to equipment storing liquid at or slightly above atmospheric pressure.

According to some embodiments of the present disclosure, an existing gas plant may be retrofitted to reduce the carbon footprint of the gas plant by retrofitting the blanketing system to use an inert gas instead of methane or other hydrocarbon gas. For example, a method may include retrofitting a gas blanketing system connected to equipment storing fluid in a gas plant by replacing a hydrocarbon gas in the gas blanketing system with an inert gas (e.g., by flushing out the hydrocarbon gas and connecting the gas blanketing system to an inert gas source). In some embodiments, retrofitting may also include rearranging inlet and outlet connections of blanketed equipment to disconnect from a hydrocarbon gas source (e.g., a methane source) and to connect to an inert gas source (e.g., added nitrogen tanks). When a hydrocarbon gas blanketing system is modified to use inert gas for blanketing, a connected atmospheric flare subsystem in the gas plant may be shut down. Atmospheric flare subsystems may have a design pressure lower than 50 psig (whereas other flare subsystems such as LP and HP flare subsystems may have a minimum design pressure of 50 psig).

In some embodiments, a gas plant may be designed and constructed to initially use an inert gas blanketing system. For example, a method may include providing a gas blanketing system using inert gas in a gas plant and connecting one or more inert gas sources to equipment in the gas plant that may store liquid and/or need blanketing. When an inert gas blanketing system is initially configured or designed with a gas plant, the gas plant may be designed to have an integrated flare system that does not include an atmospheric flare subsystem connected to the gas blanketing system.

EXAMPLES

Examples of various equipment designs and ratings are provided below and described with reference to FIGS. 8 and 9. FIGS. 8 and 9 show examples of inlet equipment that may be used in a downstream plant for connecting to an upstream plant (e.g., a GCP plant) in a plant-to-plant flare integration. The upstream plant may have the set pressure of the compressor discharge relief valve on all the GCP compressors set at 600 psig.

FIG. 8 shows a representative schematic of an inlet gas slug catcher 800 for a downstream plant. The inlet slug catcher 800 and connected upstream pipework may have their design pressure made to match the GCP compressor discharge relief valve set point so the discharge pressure of the inlet equipment to the downstream plant and the outlet to the connected upstream plant may be equal. In the example shown, the design pressure of the inlet slug catcher 800 is increased from 325 psig to 600 psig.

A fluid may flow into an inlet 801 of the inlet slug catcher 800 from a gas inlet manifold 802 (which may be connected to a transmission pipeline to connect the inlet equipment to an upstream plant). Any liquid entrained or otherwise included with the inlet gas flow may collect within the inlet slug catcher 800, and the collected liquid may flow out a condensate outlet 803 of the inlet slug catcher 800 for further processing (e.g., to a condensate separator 804). Gas may flow out of a gas outlet 805 of the inlet slug catcher 800 to a booster compressor suction knockout drum 900, as shown in FIG. 9, and then to a compressor. During an upset, turnaround, or other condition where the inlet slug catcher 800 needs to be emptied, a line from a second outlet of the slug catcher to HP flaring 806 may be opened (e.g., through a relief valve, control valve, or other pressure relief mechanism) to allow gas to flow from the slug catcher 800 to the HP flaring 800.

FIG. 9 shows a representative schematic of a booster compressor suction knockout drum 900, where gas from the inlet slug catcher 800 in FIG. 8 may be flowed into the booster compressor suction knockout drum 900. The booster compressor suction knockout drum 900 and connected upstream pipework may have their design pressure made to match the GCP compressor discharge relief valve set point so the discharge pressure of the inlet equipment to the downstream plant and the outlet to the connected upstream plant may be equal. In the example shown, the design pressure of the booster compressor suction knockout drum 900 may be increased from 425 psig to 600 psig.

Gas may be flowed from an inlet slug catcher (e.g., 800 in FIG. 8), through an inlet 901 to the booster compressor suction knockout drum 900. The booster compressor suction knockout drum 900 may include a demister wire mesh 902, which may trap entrained liquids in the gas flowing through the booster compressor suction knockout drum 900. Gravity may pull liquids from the gas to the bottom of the booster compressor suction knockout drum 900, where the collected liquids may be drained out a liquid outlet 903 and flowed to a condensate separator 904. Separated gas may flow out a gas outlet 905 at the top of the booster compressor suction knockout drum 900 to a booster compressor suction 906.

Methods

Concepts described herein may be used to design and construct gas plants having a reduced amount of flaring equipment (and thus reduced costs) and a reduced carbon footprint. For example, according to embodiments of the present disclosure, methods for constructing a gas processing system may include determining an upstream design pressure of a transmission pipeline that is connected to an upstream flare system in an upstream plant. Inlet equipment in a downstream plant may then be provided that have a downstream design pressure that is equal to the upstream design pressure of the transmission pipeline. The inlet equipment of the downstream plant may be connected to the transmission pipeline to connect the upstream plant to the downstream plant, thereby providing plant-to-plant flare integration.

Additionally, in some embodiments, methods for constructing a gas processing system may include connecting an integrated flare system to the inlet equipment of the downstream plant. The integrated flare system may include a HP flare subsystem having a reduced capacity (e.g., where the HP flare header may have a capacity less than the inlet equipment, or where the HP flare header may have a design pressure less than the design pressure of the transmission pipeline connecting the downstream plant to the upstream plant) and/or an integrated flare subsystem (which may be connected to and flare gas from at least two different gas processing systems).

In some embodiments, rather than designing and constructing a new integrated gas processing system, an existing gas processing system may be retrofitted to incorporate one or more flare integration concepts according to embodiments of the present disclosure. For example, in some embodiments, inlet equipment to a downstream plant may be replaced or reconfigured to have a design pressure that equals the design pressure of a transmission pipeline connecting the downstream plant to an upstream plant, and a HP flare subsystem in the downstream plant may be modified to have a reduced capacity.

When designing a new oil and gas processing system or modifying an existing system, designers continuously look for opportunities to respond to increasingly tighter climate change regulations by placing emphasis on limiting the carbon footprint of their designs. Embodiments disclosed herein identify the facility flare system as a major factor that may be considered to minimize carbon footprint of the system design in a significant way, as flare systems emit gases from burning purge gas and during emergencies.

For example, as described herein, integrated flare systems according to embodiments of the present disclosure may be used to minimize the carbon footprint of gas processing systems (e.g., including natural gas liquid (NGL) recovery plants). For example, when comparing an integrated flare system according to embodiments disclosed herein with a conventional flare system for a gas plant processing sour gas (which typically includes independent High Pressure, Cryogenic Flare, Low Pressure, Acid Gas, and Atmospheric flare systems), the carbon footprint of the integrated flare system was reduced by approximately 50 percent.

Another advantage to using integrated flare systems according to embodiments of the present disclosure is that the size and/or amount of equipment used in a gas processing system may be reduced. For example, the design capacity of a HP flare header may be reduced by approximately 48%, by integrating the flare system design in a downstream gas plant with a flare system in an upstream plant (e.g., a GCP), which may be integrated by storing a lot of the gases that would have been flared as a result of operational upsets or emergency in the transmission pipeline between the upstream and downstream plants. The optimization resulting from integrated flare systems disclosed herein may also include reduction in the size of the main HP flare header of the downstream gas plant (e.g., from 72" to 48"), reduction in the flare plot area by about 30 percent, reduction in the flare stack height by over 20 percent, and elimination of equipment units used in the downstream gas plant, including elimination of at least one of a large flare knock-out drum, a flare stack, a LP flare system and an atmospheric flare system, where elimination of equipment units may result in significant capital savings. The system reduction may be achieved by re-rating the design pressure of the inlet equipment (e.g., the inlet slug catcher) of the downstream gas plant, to match the design pressure of the upstream plant via the transmission pipeline.

Additionally, the upstream plant may be equipped with adequate relief valves to respond to a blocked outlet scenario in a connected downstream plant (and hence, prevent overpressure in the downstream gas plant), since the inlet equipment of the downstream plant may be rated to the set point of the relief valves in the upstream plant.

By using integration concepts described herein, savings may be realized in facilities following a phased development approach, in which the capacity is to be gradually increased (e.g., from 1.1 BSCFD (billion standard cubic feet per day) to 3.7 BSCFD over an extended period of time). The flare system may be designed in a "pre-invested" manner to serve the ultimate capacity of the plant, to avoid safety and operational risks related to future construction of new flare systems, not to mention a lower net present value. Thus, according to embodiments of the present disclosure, design of a downstream plant may include considering the configuration of an upstream plant and determining whether an integration of the downstream plant with the upstream plant may be achieved to minimize the size of the downstream flare system. Savings from using flare integration systems described herein may include savings in operating expenses (OPEX) and savings in capital expenses (CAPEX) from using less equipment.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed:

1. A method for constructing a gas processing system, comprising:
  determining an upstream design pressure of a transmission pipeline connected to an upstream plant having an upstream flare system;
  providing inlet equipment in a downstream plant having a design pressure that is equal to or greater than the upstream design pressure, wherein the inlet equipment comprises a selection from at least one of an inlet slug catcher and an inlet knockout drum, and wherein the inlet equipment further comprises associated piping and valves; and
  connecting the inlet equipment to the transmission pipeline to connect the upstream plant to the downstream plant.

2. The method of claim 1, further comprising:
  providing a gas blanketing system in the downstream plant, wherein the gas blanketing system comprises an inert gas; and
  providing a downstream flare system in the downstream plant, wherein the downstream flare system is provided without an atmospheric flare subsystem.

3. The method of claim 1, further comprising:
  retrofitting a gas blanketing system connected to equipment storing fluid in the downstream plant, wherein retrofitting comprises:
    replacing a hydrocarbon gas in the gas blanketing system with an inert gas; and
    shutting down an atmospheric flare subsystem connected to the gas blanketing system in the downstream plant.

4. The method of claim 1, further comprising:
connecting a downstream flare system to the inlet equipment, wherein the downstream flare system comprises:
 a high pressure flare header connected to the inlet equipment;
 wherein the high pressure flare header has a volume capacity less than the inlet equipment, and wherein the high pressure flare header is fluidly connected to high pressure equipment having a design pressure greater than 150 psig.

* * * * *